United States Patent [19]

Hautau

[11] 3,851,515
[45] Dec. 3, 1974

[54] APPARATUS FOR CUTTING OR DEFORMING A WORKPIECE

[76] Inventor: Charles F. Hautau, 146 Hilltop Rd., Oxford, Ohio 45056

[22] Filed: Sept. 4, 1973

[21] Appl. No.: 393,925

[52] U.S. Cl.............................. 72/121, 82/72, 82/73
[51] Int. Cl............................................. B21d 41/04
[58] Field of Search .......... 82/70.2, 72, 73; 72/100, 72/121

[56] References Cited
UNITED STATES PATENTS

| | | | |
|---|---|---|---|
| 2,373,472 | 4/1945 | Haumiller | 82/72 |
| 3,296,845 | 1/1967 | Prutton | 72/100 |
| 3,365,924 | 1/1968 | Cummings | 72/121 |
| 3,478,627 | 11/1969 | Marion | 72/70.2 |
| 3,522,747 | 8/1970 | Brownstein | 82/72 |
| 3,613,489 | 10/1971 | Randich | 82/70.2 |

*Primary Examiner*—Lowell A. Larson
*Attorney, Agent, or Firm*—Jacox & Meckstroth

[57] ABSTRACT

A rotor supports a set of uniformly arranged quills each rotatable on a corresponding axis eccentric to the axis of the rotor. A rotatable spindle is eccentrically supported by each quill and is adapted to receive a metal cutting or forming tool element. The quills are simultaneously rotated or oscillated by corresponding pinions which engage a gear carried by the rotor and supported for relative rotation on the rotor axis. In one embodiment, the rotor is mounted on a tubular shaft of a speed reducer, and the gear within the rotor is mounted on a concentric tubular shaft which is oscillated in response to reciprocation of a helical ball screw assembly actuated by a fluid cylinder. An ejector rod extends axially into the rotor through the concentric tubular shafts and supports a member for ejecting portions cut from the workpiece. In another embodiment, an annular rotor is supported within a housing and is driven by endless belts extending from an electric motor mounted on the housing. The rotor also carries an electric motor which drives a ring gear engaging the pinions on the quills, and the motor is selectively controlled through electrical contacts engaging slip rings on the rotor.

15 Claims, 5 Drawing Figures

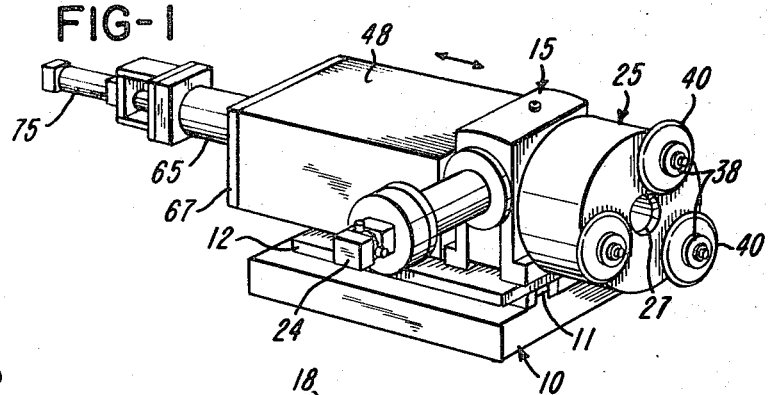
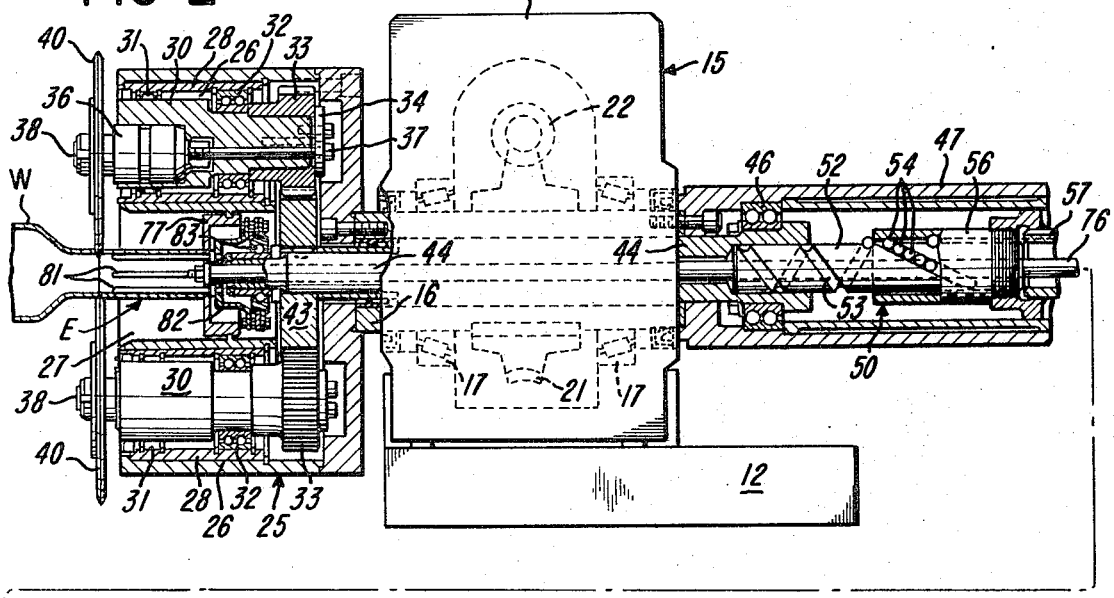
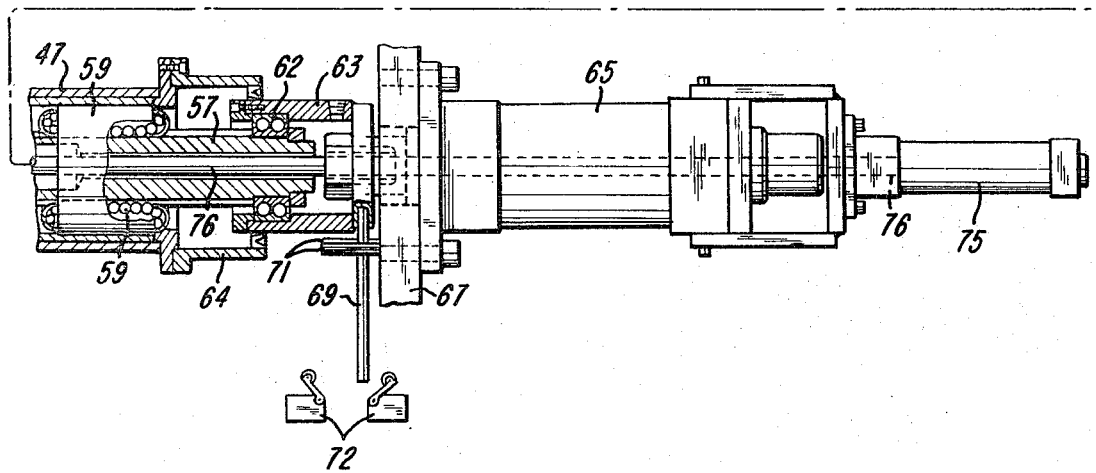

APPARATUS FOR CUTTING OR DEFORMING A WORKPIECE

BACKGROUND OF THE INVENTION

In machines for performing a cutoff operation of an elongated workpiece such as a metal tube, it is common for a rotary head member to carry a set of radially movable yoke members which are slidably supported by gibs and carry corresponding freely rotatable circular cutting knives. The yoke members are radially movable in response to actuation of an axially movable cam and linkage mechanism. It has been found that such a tube cutoff machine is particularly suited for cutting lightweight tubing since it does not provide for substantial durability and rigidity. For example, the cutter wheels are of relatively small diameter and rotate at a high speed, thereby reducing the life of the peripheral cutting edges. In addition, the cutter wheels are supported by small bearings which tend to wear and cause the cutter wheels to have poor wheel guidance, sometimes resulting in the wheels chasing a thread on the workpiece and thereby resulting in the wheels either destroying themselves or marring the workpiece. Furthermore, after the cutting wheels and actuating mechanism become worn, it is difficult and requires substantial time for replacing the cutting wheels and mechanism. This results in significant down time of the cutoff machine.

SUMMARY OF THE INVENTION

The present invention is directed to improved apparatus for cutting or forming a nonrotating workpiece such as a stationary pipe or tube or a tube which is being continuously formed, for example, by a rolling mill. The apparatus of the invention provides the important features of high speed and dependable operation and assures that the cutoff or forming wheels are precisely and rigidly supported so that the wheels track circumferentially in precision alignment. In addition, the cutoff or forming apparatus of the invention may be constructed for accommodating workpieces of substantial size and is also adapted for numerical or digital control so that the apparatus may be operated automatically and used for forming a contoured surface on the workpiece.

In accordance with one embodiment of the invention, a cylindrical head or rotor is supported by a tubular output shaft of a speed reducer driven by a hydraulic motor. The rotor has a center cavity which is surrounded by a set of eccentrically located quills adapted to be simultaneously oscillated in response to oscillation of a sun gear. The sun gear is mounted on another tubular shaft extending concentrically through the rotor support shaft of the gear reducer, and is oscillated in response to linear actuation of a helical ball screw mechanism connected to a fluid cylinder. Each of the quills supports an eccentrically positioned freely rotatable spindle on which is mounted a cutter wheel. When the quills are oscillated, the cutter wheels revolve inwardly and cooperate to cut off the workpiece. The scrap portion of the workpiece within the rotor cavity, is ejected by an ejector member mounted on a nonrotating rod extending axially through the tubular shafts to another fluid cylinder.

In another embodiment of the invention, the rotor is supported by bearings retained within a surrounding nonrotating housing, and a ring gear is driven or oscillated by an electric motor carried by the rotor for simultaneously oscillating the quills to effect revolving movement of the cutter wheels and cutoff of the workpiece. The annular rotor is driven by endless flexible belts extending from a main drive motor mounted on the housing. A set of slip rings on the rotor are engaged by corresponding sliding brushes for digitally or numerically controlling the electric motor carried by the annular rotor for producing predetermined orbital movement of the cutter wheels. The numerically controlled machine may also be used for rolling or deforming a workpiece simply by replacing the cutoff wheels with rolling wheels.

Other features and advantages of the invention will be apparent from the following description, the accompanying drawings and the appended claims.

BRIEF DESCRIPTION OF THE DRAWING

FIG. 1 is a perspective view of a machine or apparatus for cutting a nonrotating workpiece and which is constructed in accordance with the invention;

FIG. 2 is an axial vertical section of a portion of the apparatus shown in FIG. 1, with other portions shown in elevation;

DESCRIPTION OF THE PREFERRED EMBODIMENTS

Figure 3:
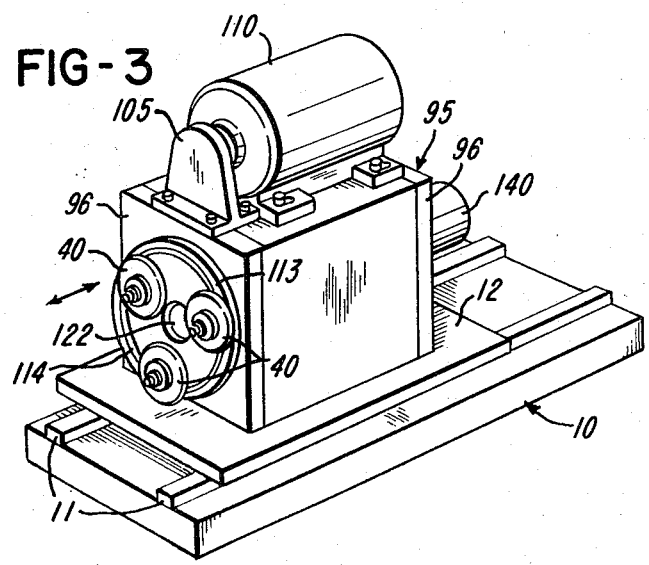
FIG. 3 is a perspective view of another cutoff machine or apparatus constructed in accordance with the invention.

The cutoff machine or apparatus shown in FIGS. 1 and 2 is adapted for quickly trimming and removing an end portion E of a tubular metal workpiece W such as a muffler for a motor vehicle. The apparatus includes a generally flat base member 10 having a set of parallel spaced tracks 11 which support a horizontal platform 12 for linear movement. Preferably, the tracks 11 incorporate recirculating preloaded linear bearings (not shown), and the platform 12 is reciprocated relative to the base 10 by a motor driven preloaded ball screw which provides precision movement of the platform 12.

A speed reducer 15 is mounted on the platform 12 and includes a tubular output shaft 16 which is rotatably supported by a set of antifriction bearings 17 confined within a surrounding housing 18. A worm gear 21 is mounted on the shaft 16 and is driven by a worm 22 connected to the output shaft of a hydraulic drive motor 24. A cylindrical head member or rotor 25 is secured to the forward end of the shaft 16 for rotation on the axis of the shaft. The rotor 25 has a set of three uniformly spaced eccentric cavities 26 which surround a center cavity 27 and receive a corresponding set of cylindrical bearing sleeves 28. A stepped cylindrical quill 30 is supported within each of the bearing sleeves 28 by a front needle bearing 31 and a rear ball bearing 32 and the rearward end portion of each quill 30 receives a gear or pinion 33 retained by a plate 34.

Each of the quills 30 includes an eccentric cylindrical cavity or bore which receives a hollow spindle support body 36 retained within the bore by an axially extending screw 37. Each of the bodies 36 supports a set of antifriction bearings (not shown) which, in turn, support a spindle 38. A circular cutting knife or wheel 40 is secured to the forward end portion of each spindle 38 and is free to rotate with the spindle 38 as a result of the spindle support bearings within the body 36. The assembly of each body 36, the corresponding spindle 38 and the internal antifriction support bearings, is available as a "spinning live center" commonly used on a turret lathe. Each of the cutter wheels 40 has a sharp peripheral edge, and the wheels are adapted to be brought into engagement with the workpiece W when the quills 30 are rotated, as will be explained later.

Each of the gears or pinions 33 engages a sun gear 43 mounted on the forward end portion of a tubular shaft 44 which extends concentrically through the tubular shaft 16 of the speed reducer 15. The rearward end portion of the shaft 44 is rotatably supported by a bearing 46 confined within an elongated rotary support tube 47 which is secured to the rearward end of the shaft 16 and extends through the center of a box-like housing 48 (FIG. 1) also mounted on the platform 12. The sun gear 43 and the tubular shaft 44 are supported of oscillation relative to the rotor 25 while the rotor is rotating at a relatively fast speed, for example, 700 rpm. This oscillation is produced by actuation of a helical ball screw mechanism 50 which is confined within the support tube 47.

The mechanism 50 includes a cylindrical rod 52 having a helical groove 53 for receiving a series of balls 54 confined within a sleeve 56 secured to the forward end portion of a spline shaft 57. The spline shaft 57 is supported for rotation with the support tube 47 and for relative linear movement by a set of recirculating linear ball bearings 59 so that the sleeve 56 may be moved axially relative to the helically grooved rod 52. The rearward end portion of the splined shaft 57 is supported for rotation by a ball bearing 62 which is confined within a nonrotating cup-shaped support member 63 adapted to move axially within an extension sleeve 64 secured to the support tube 47.

The support member 63 is secured to the forward end portion of a tubular piston rod of a fluid or hydraulic cylinder 65 which is mounted on the rearward end wall 67 of the housing 48. The cup-shaped support member 63 is prevented from rotating by a torque rod 69 which extends between a pair of parallel spaced pins 71 projecting from the end wall 67 of the housing 48. A set of control switches 72 are alternately actuated by the reciprocating movement of the rod 69 and control solenoid valves (not shown) through which hydraulic fluid is supplied to the cylinder 65. The rod 69 may also be used to actuate a unit which provides for a digital feedback of the linear movement of the spline shaft 57 and the corresponding oscillation of the quills 30.

Another fluid cylinder 75 is mounted on the rearward end of the cylinder 65 and actuates a nonrotating rod 76 which extends axially through the piston rod of the cylinder 65 and the centers of the splined shaft 57 and tubular shaft 44. The forward end portion of the rod 76 is secured to a nonrotating cylindrical ejecting member 77 which is adapted to move axially within the cylindrical cavity 27 formed within the center portion of the rotor 25. The ejecting member 77 has a set of holes which receive a set of stationary pins or prongs 81 which are cantileveredly supported by a cup-shaped bracket 82 supported by an antifriction bearing 73 mounted on the forward end portion of the tubular shaft 44.

The cutoff machine shown in FIGS. 1 and 2, operates in the following manner. The workpiece W is clamped in a fixture (not shown), and the entire assembly supported by the platform 12, including the gear reducer 15, the rotor 25 and the housing 48, are advanced axially so that the end portion E of the workpiece is received within the center cavity 27 of the rotor 25. While the rotor 25 is rotating at a predetermined speed, the hydraulic cylinder 65 is actuated so that the member 63 and tubular spline shaft 57 are extended axially a predetermined distance such as, for example, three inches.

The axial extension of the spline shaft 57 and the ball screw housing 56 produces rotation of the ball screw rod 52 and the sun gear 43 in one direction through a predetermined angle. Rotation of the sun gear 43 is effective to rotate the quills 30 simultaneously so that the cutter wheels 40 are brought into engagement with the tubular end portion E of the workpiece W, as illustrated in FIG. 2. The stationary end portion E of the workpiece W is supported by the projecting stationary fingers or prongs 81 so that after the end portion is severed from the workpiece W, the end portion E continues to be supported by the prongs 81.

After the end portion E is cut off by the inward movement of the wheels 40, the cylinder 65 is again actuated so that the spline shaft 57 and the ball screw housing 56 are retracted. This rotates the sun gear 43 in the opposite direction so that the rotation of the quills 30 is reversed, and the cutter wheels are revolved to their original or normal outer positions. After the trimmed workpiece W is removed, the hydraulic cylinder 75 is actuated to extend the rod 76 and the ejector member 77 so that the end portion E is ejected axially from the stationary prongs 81 and is permitted to drop into a scrap receiving container. While only one cutoff machine is shown in FIGS. 1 and 2, it is to be understood that a pair of the cutoff machines may be located in opposed relation at the opposite ends of the workpiece W if it is desired to trim simultaneously both end portions E of the workpiece W.

Figure 4:
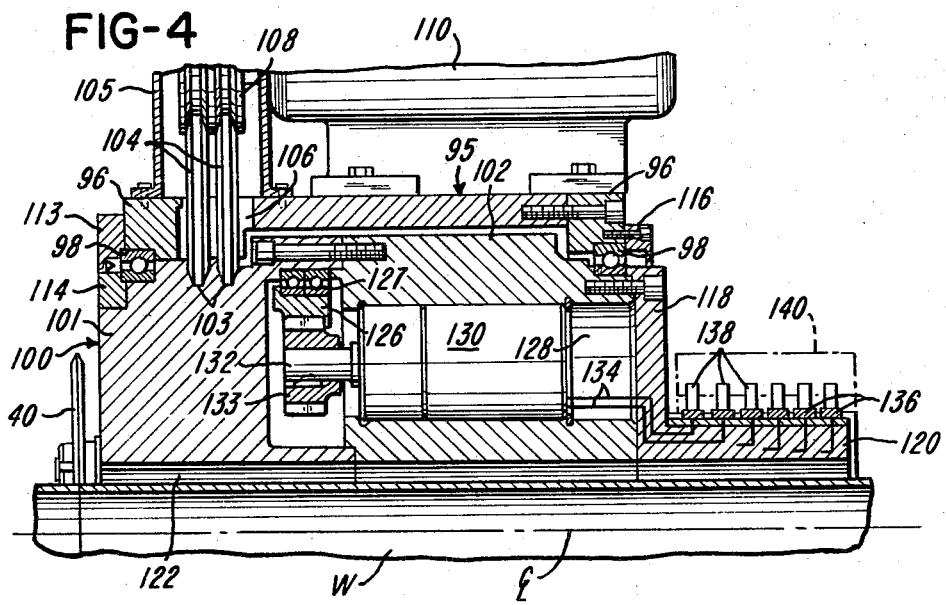
FIG. 4 is a vertical radial section of the apparatus shown in FIG. 3.
Figure 5:
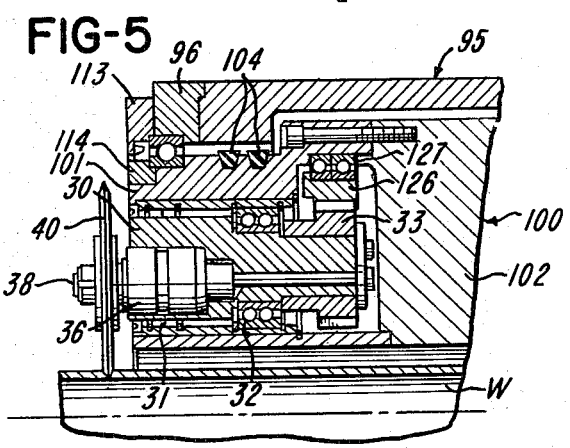
FIG. 5 is a fragmentary radial section taken at an angular position relative to the vertical section of FIG. 4.

Referring to FIGS. 3–5 which show another embodiment of the invention, a box-like housing 95 is mounted on the platform 12 for linear movement along the tracks 11 of the base plate 10. The housing 95 includes a set of front and rear end plates 96 which include counterbores for receiving the outer races of a pair of large diameter ball bearings 98. An annular rotor 100 is supported by the bearings 98 and includes a forward end portion 101 which mates with a rearward end portion 102. The forward end portion 101 of the rotor 100 includes a set of circumferential grooves 103 for receiving a pair of endless V-belts 104 which extend upwardly through a slot 106 formed within the housing 95 to a double sheave 108 mounted on the shaft of an electric main drive motor 110. The motor 110 is mounted on the housing 95 for relative vertical adjustment by the use of either shims or a tilt base plate (not shown) to provide for selecting the tension within the belts 104. The sheave 108 and the belts 104 are covered by a housing member 105 which is secured to the housing 95.

The outer race of the front bearing 98 is retained by a retaining ring 113 secured to the front end plate 96, and the inner race of the bearing is retained by a ring 114 secured to the forward end of the rotor 100. A similar retaining ring 116 retains the outer race of the rear bearing 98, and the inner race of the rear bearing 98 is retained by a circular cover plate 118 which is formed as an integral part of a cylindrical hub portion 120 projecting rearwardly as part of the rotor 100. As mentioned above, the rotor 100 is annular and defines a cylindrical center passage or bore 122 which is adapted to receive or surround an elongated workpiece W such as a tube being continuously produced by a rolling mill.

Referring to FIG. 5, the forward portion 101 of the rotor 100 supports a set of three uniformly spaced quills 30 and corresponding eccentric spindles 38 in the same manner as the rotor 25 described above in connection with FIG. 2. Accordingly, the same reference numbers are used to identify the respective components of the quill assemblies. Instead of engaging the sun gears 43, however, the pinions 33 engage an outer ring gear 126 which is supported by a pair of ball bearings 127 retained within a counterbore formed within the forward portion 101 of the rotor 100.

A cylindrical bore 128 (FIG. 4) is formed within the rearward portion 102 of the rotor 100 between two of the quills 30 and receives a reversible electric motor 130. The motor 130 has a forwardly projecting shaft 132 which supports a pinion 133 which also engages the ring gear 126 at a midpoint between the two corresponding pinions 33 mounted on the rearward end portions of the two adjacent quills 30. The reversible motor 130 may consist of a stepping motor which rotates the shaft 132 in accordance with the number of electrical pulses supplied to the motor. The motor 130 may also be of the type which automatically stalls and reverses when it senses a predetermined torque, for example, as produced by incorporating angularly spaced stops on the ring gear 126. In addition, the motor 130 may be provided with a digital feedback for indicating the operation of the motor.

The electrical power or pulses is supplied to the motor 130 through electrical conductors 134 which extend through axial holes formed within the hub portion 120 of the rotor 100 and engage corresponding slip rings 136 mounted on the hub portion 120. A corresponding set of brushes 138 are positioned for sliding contact with the slip rings 136 and are supported by an annular stationary brush holder 140. The motor 130 is counterbalanced by weights (not shown) which are inserted into generally diametrically disposed holes formed within the rearward portion 102 of the rotor 100.

As mentioned above, the cylindrical bore 122 of the rotor 100 is adapted to receive an elongated or continuously feeding workpiece such as the tubular workpiece W shown in FIGS. 4 and 5. The cutoff wheels 40 are normally positioned in their radially outer positions with the rotor 100 rotating at a constant speed. When it is desired to cut the workpiece W, the reversible motor 130 is actuated so that the ring gear 126 is rotated in one direction relative to the rotor 100. The rotation of the ring gear 126 is effective to rotate the quills 30 by 180° in a preselected time so that the cutter wheels 40 revolve into engagement with the workpiece W and are effective to cut through the tubular wall of the workpiece. After the cutting operation is completed, the motor 130 is reversed so that the quills 30 rotate again 180° for returning the cutter wheels 40 and support sindles 38 to their radially outer home positions.

From the drawings and the above description, it is apparent that a machine constructed in accordance with the present invention, provides desirable features and advantages. For example, the support of the quills 30 and the spindles 38 within either the rotor 25 or 100, provides for using relatively large diameter cutter wheels 40 and for rotatably supporting the cutter wheels with substantial rigidity. The larger diameter of the cutter wheels 40 provides for a longer life of the cutting edge, and the bearing supports for the quills 30 and spindles 38 assure that the cutter wheels remain in precise radial alignment and cooperate to effect rapid cutoff of the workpiece. In both of the embodiments illustrated, the rapid simultaneous rotation of the quills 30 while the rotor is rotating, may be precisely controlled by controlling the actuation of the hydraulic cylinder 65 or electrical motor 130. Also in both embodiments, the bearings for supporting the oscillating quills 30 and the bearings for supporting the spindle 38, are completely enclosed within the rotor 25 or 100, which is desirable from a safety standpoint. The cutter wheels 40 are radially enclosed by a stationary inverted U-shaped guard member (not shown).

The embodiment shown in FIGS. 3–5 provides the additional features of a rotor having a hollow bore so that the machine may be used as a traveling cutoff for nonrotating tubing which is being continuously produced by a rolling or extrusion mill. Furthermore, the mass of the rotor 100 provides a flywheel effect to assure a constant speed of the cutter wheels 40 around the workpiece, and the drive belts 104 may be conveniently replaced simply by removing the front end plate 96 and the front bearing 98.

As mentioned above, the extent of relative rotation or oscillation of the quills 30 may be controlled while the rotor 25 or 100 is rotating simply by controlling the electrical pulses supplied to the motor 130. As a result, it is apparent that the cutoff wheels 40 may be replaced by other cutting or rolling machine tool elements to provide for forming a predetermined contoured surface on the workpiece as the workpiece is either being fed axially through the rotor 100 or the rotor is moved axially relative to the workpiece. It is also to be understood that while three cutoff wheels 40 are illustrated in the drawing on each of the rotors 25 and 100, only a single cutoff wheel and a pair of back-up rollers may be used with a corresponding increase in the time required for cutting the workpiece. The embodiment shown in FIGS. 3–5 is also adapted to be constructed so that the annular rotor has a large diameter for cutting a large-diameter stationary tubular workpiece such as a pipe having a diameter of four feet or greater. In this construction, the rotor would support a series of circumferentially spaced quills 30 all of which would operate simultaneously as a result of oscillation of the ring gear 126.

While the forms of apparatus herein described constitute preferred embodiments of the invention, it is to be understood that the invention is not limited to these precise forms of apparatus, and that changes may be made therein without departing from the scope and spirit of the invention as defined in the appended claims.

The invention having thus been described, the following is claimed:

1. Apparatus adapted for cutting an elongated nonrotating workpiece, comprising an annular rotor adapted to surround the workpiece, means supporting said rotor for rotation on a first axis aligned generally with the axis of the workpiece, a plurality of quills each supported eccentrically within said rotor for rotation on a corresponding second axis extending parallel to said first axis, a spindle supported within each of said quills for rotation on a corresponding third axis eccentric to said second axis of said quill and adapted to receive a rotary tool element, drive means connected to rotate said rotor for revolving said tool elements around the workpiece, a motor positioned eccentrically within said rotor, and means driven by said motor for producing simultaneous rotation of said quills within said rotor while said rotor is rotating to effect engagement of the tool elements with the workpiece.

2. Apparatus adapted for cutting a nonrotating workpiece, comprising a rotor, means supporting said rotor for rotation on a first axis aligned generally with the workpiece, at least one quill supported within said rotor for rotation on a second axis extending parallel to said first axis, a spindle supported within said quill for rotation on a third axis eccentric to said second axis and adapted to receive a rotary tool element, drive means connected to rotate said rotor for revolving said tool element around the workpiece, a motor disposed eccentrically within said rotor and having a shaft, and means connecting said shaft of said motor to said quill to cause predetermined rotation of said quill within said rotor when said motor is actuated and while said rotor is rotating to effect engagement of the tool element with the workpiece.

3. Apparatus as defined in claim 2 wherein said rotor includes an axially extending eccentric first bore, said means supporting said quill comprises a set of axially spaced anti-friction bearings positioned within said first bore, said quill including an axially extending eccentric second bore, and a set of axially spaced anti-friction bearings within said second bore for supporting said spindle.

4. Apparatus as defined in claim 2 including a set of three said quills supported within said rotor, one of said spindles supported for free rotation within each of said quills, a pinion secured to each of said quills, a ring gear supported for rotation within said rotor on said first axis and engaging each of said pinions, said motor positioned eccentrically within said rotor between two adjacent said quills, and a pinion driven by said motor and engaging said ring gear.

5. Apparatus adapted for cutting an elongated nonrotating workpiece, comprising an annular rotor adapted to surround the workpiece, means supporting said rotor for rotation on a first axis aligned generally with the axis of the workpiece, at least one spindle positioned eccentrically within said rotor and adapted to support a tool element for rotation on a second axis parallel to said first axis, means supporting said spindle for orbiting movement about a third axis extending parallel to said first and second axis, drive means connected to rotate said rotor for revolving said spindle and said tool element around the workpiece, a motor positioned eccentrically within said rotor, and means responsive to operation of said motor for orbiting said spindle about said third axis while said rotor is rotating on said first axis to effect engagement of the tool element with the workpiece.

6. Apparatus as defined in claim 5 wherein said rotor, said means supporting said rotor and said drive means for said rotor are supported for linear movement as a unit.

7. Apparatus as defined in claim 5 wherein said motor comprises an electrically controlled motor, and an electrical slip ring assembly for supplying electrical power to said motor.

8. Apparatus as defined in claim 7 wherein said motor comprises a stepping motor.

9. Apparatus as defined in claim 5 including counterweight means on said rotor to effect counterbalancing of said motor.

10. Apparatus as defined in claim 5 wherein said rotor provides a flywheel effect, means defining a circumferential belt groove within said rotor, and said drive means includes at least one endless flexible belt extending around said rotor.

11. Apparatus as defined in claim 5 including a housing surrounding said rotor, a set of anti-friction bearings mounted on said housing and supporting said rotor, said drive means for said rotor include a motor mounted on said housing, and at least one endless belt connecting said motor to said rotor.

12. Apparatus as defined in claim 11 including means for removing and replacing said belt without removing said rotor from said housing.

13. Apparatus adapted for cutting an elongated nonrotating workpiece, comprising a rotor, means supporting said rotor for rotation on a first axis aligned generally with the axis of the workpiece, at least one spindle positioned eccentrically within said rotor and adapted to support a tool element for rotation on a second axis, means supporting said spindle for orbiting movement about a third axis extending parallel to said first and second axis, drive means connected to rotate said rotor for revolving said spindle and said tool element around the workpiece, a fluid cylinder including a piston movable axially relative to said rotor, actuating means for orbiting said spindle about said third axis in response to axial movement of said piston, and said actuating means including a helical ball screw member supported within a surrounding generally cylindrical sleeve member by a set of balls.

14. Apparatus as defined in claim 13 wherein said means supporting said rotor comprise a gear reducer having a tubular output shaft secured to said rotor, said drive means comprise a fluid motor connected to an input shaft of said speed reducer, and said means for producing predetermined rotation of said quill comprise another shaft extending axially within said tubular output shaft of said gear reducer.

15. Apparatus as defined in claim 13 wherein said rotor defines a center cavity adapted to receive an end portion of the workpiece, means disposed within said cavity for non-rotative movement and adapted to support the end portion of the workpiece, an ejecting member supported for axial movement within said cavity, and means for moving said ejecting member axially while said rotor is rotating.

* * * * *